Oct. 14, 1958    F. L. BARRETEAU    2,855,685
BORE HOLE APPARATUS
Filed Jan. 31, 1955    2 Sheets-Sheet 1

INVENTOR.
FELIX L. BARRETEAU.
BY Robert Hockfield
HIS ATTORNEY.

Oct. 14, 1958

F. L. BARRETEAU 2,855,685

BORE HOLE APPARATUS

Filed Jan. 31, 1955

INVENTOR.
FELIX L. BARRETEAU

BY *Robert Hockfield*

HIS ATTORNEY.

United States Patent Office 2,855,685
Patented Oct. 14, 1958

2,855,685
BORE HOLE APPARATUS

Felix L. Barreteau, Ridgefield, Conn., assignor, by mesne assignments, to Schlumberger Well Surveying Corporation, Houston, Tex., a corporation of Texas Application January 31, 1955, Serial No. 485,274

9 Claims. (Cl. 33—169)

This invention relates to bore hole apparatus and, more particularly, pertains to new and improved apparatus for determining the thickness of the mud cake which may be deposited on the wall of a bore hole drilled into the earth.

Various devices have been proposed heretofore for measuring mud cake thickness utilizing relatively sharp and blunt instruments having different degrees of penetrability. These instruments are applied to different portions of the side wall of a bore hole under investigation, but since a bore hole is characteristically non-uniform, accurate mud cake measurements may not always be obtained.

To obviate this deficiency, it has also been proposed to employ a blunt instrument having an opening through which the sharp instrument may move. However, this arrangement has proved to be unsatisfactory because accumulations of mud on the sharp instrument frequently inhibit its movement relative to the blunt instrument.

It is, therefore, an object of the present invention to provide new and improved bore hole apparatus for measuring mud cake thickness which is not subject to the foregoing deficiencies of certain prior art arrangements.

Another object of the present invention is to provide new and improved bore hole apparatus for determining mud cake thickness in a relatively limited side wall portion of a bore hole thereby to minimize errors which might be incurred if spaced sections were simultaneously examined.

Yet another object of the present invention is to provide new and improved bore hole apparatus for determining mud cake thickness in which clogging effects of the drilling mud are minimized.

Bore hole apparatus in accordance with the present invention comprises a first wall-engaging member adapted to be passed through a bore hole. This member has a relatively large surface arranged for substantially non-penetrating engagement with the side wall of the bore hole. The apparatus further comprises a second wall-engaging member supported by the first wall-engaging member for movement relative thereto. It is biased with respect to the first wall-engaging member toward the side wall of the bore hole and has a relatively small cutting edge adapted to penetrate a side wall portion of the bore hole. Means are provided for obtaining a record of relative movement between the first and second wall-engaging members.

According to another aspect of the invention, the second wall-engaging member is constructed of an electrically conductive material and a source of electric current is connected to it so that a current flows between this member and the drilling liquid which may fill the bore hole. The polarity and magnitude of the current are arranged to minimize the accumulation of extraneous material on the second wall-engaging member.

The novel features of the present invention are set forth with particularity in the appended claims. The present invention, both as to its organization and manner of operation, together with further objects and advantages thereof, may best be understood by reference to the following description taken in connection with the accompanying drawings in which:

Figure 1:
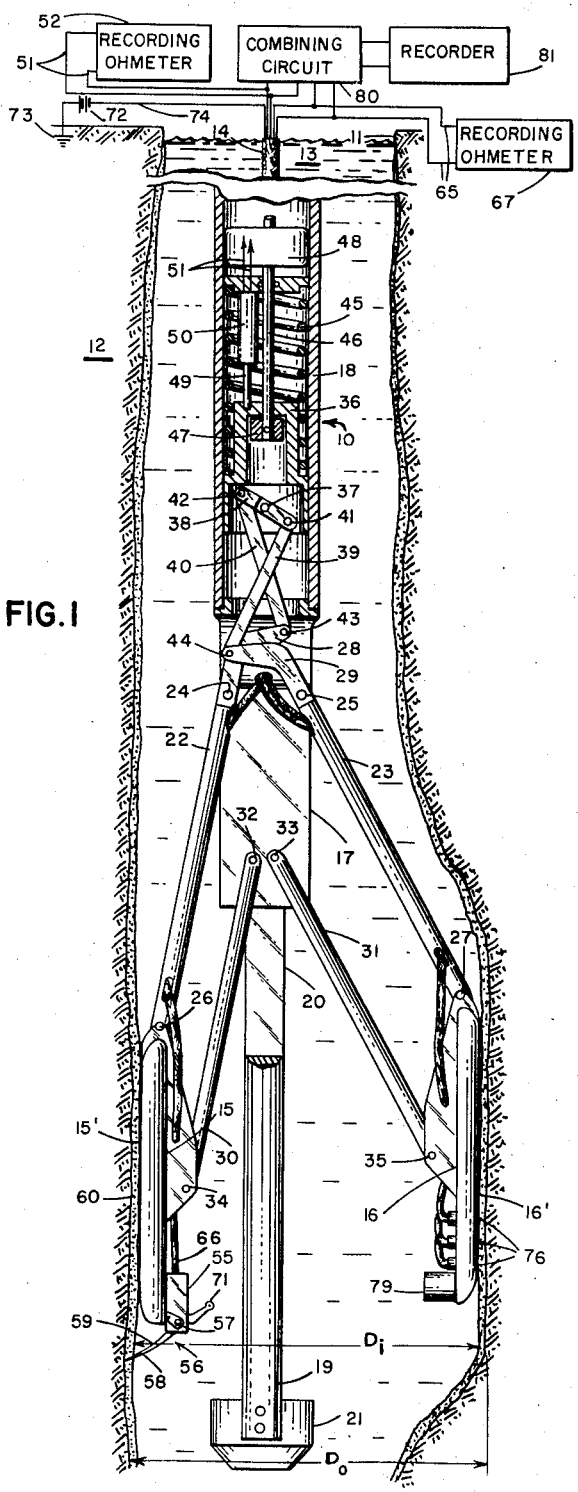
Fig. 1 is a schematic representation, partly in longitudinal section, of bore hole apparatus embodying the present invention shown in operative condition in a bore hole.

In Fig. 1 of the drawings, a bore hole tool 10 is shown in operative position within a bore hole 11 traversing earth formations 12 and containing a relatively conductive drilling liquid 13, such as a water base mud. Tool 10 is suspended in bore hole 11 by an armored cable 14 which may be employed in connection with a conventional winch (not shown) to lower and raise tool 10 in a customary manner.

Bore hole tool 10 is provided with two side wall engaging pads 15 and 16 movably connected to a support 17 that extends from the lower end of a cylindrical housing 18, in turn, adapted to be connected to cable 14 by means which are not shown. These pads 15 and 16 have relatively large side wall engaging surfaces 15' and 16' arranged for non-penetrating engagement with the side wall of bore hole 11 thereby to determine the maximum outward extent of movement of the pads. From the lower portion of support 17 there extends an open frame consisting of parallel rod members 19 and 20 that terminate at a rounded bottom nose 21.

Although any of a variety of well known mechanisms may be employed for displacing members 15 and 16 relative to support 17, preferably a mechanism may be utilized such as described in the copending application of Rene Roussin, filed July 13, 1954, Serial Number 443,057, and assigned to the same assignee as the present invention. In brief, by means of this mechanism members 15 and 16 are independently movable with respect to support 17; however, they are always maintained in parallel relation to the longitudinal axis of support 17.

To this end, two diametrically opposite arms 22 and 23 are pivotally connected to support 17 at one of their ends by pins 24 and 25, and the remaining ends are connected by pivot pins 26 and 27 to the upper ends of pads 15 and 16, respectively. Upper extensions 28 and 29 of arms 22 and 23 extend inwardly toward the longitudinal axis of tool 10, and they are spaced laterally from one another to permit relative movement. Another pair of arms 30 and 31 are pivotally connected by pins 32 and 33 to a portion of support 17 below pins 24 and 25, and the remaining ends of these arms are connected by pins 34 and 35 to central, inner portions of members 15 and 16. Thus, the members 15 and 16 are coupled to support 17 by a parallelogram arrangement which permits relative movement between these elements while maintaining members 15 and 16 parallel to the longitudinal axis of bore hole tool 10.

Movable inside housing 18 is a driving element 36 connected by a pin 37 to a central portion of a rocker arm 38. Linkages 39 and 40 are connected at their ends to the extremities of rocker arm 38 by pivot pins 41 and 42, and the remaining ends of linkages 39 and 40 are pivotally connected to extensions 28 and 29 by pivot pins 43 and 44.

A compression spring is positioned within housing 18 to provide a bias tending to urge driving element 36 in a downward direction and a rod 46 extending through an opening in driving element 36 is provided with an enlarged head 47 so that although the rod is movable relative to the driving element, upward movement of rod 46 withdraws the element against the bias of spring 45. This movement is provided by an electric motor 48 through which rod 46 extends. By means of an electrical circuit (not shown), extending to the surface of the earth, the motor 48 may be selectively energized and de-energized at the discretion of an operator at the surface.

Coupled to driving element 36 is an arm 49 mechanically connected to a potentiometer 50 which moves as a function of the vertical position of driving element 36. Thus, the electrical resistivity exhibited by potentiometer 50 at its output leads 51 is a direct function of the position of driving element 36 and extensions of these leads pass through cable 14 and are coupled to a recording ohm meter 52 located at the surface of the earth. The recording medium of ohm meter 52 is displaced in proportion to movement of bore hole tool 10 through bore hole 11 and inasmuch as the position of driving element 36 is a function of the diametrical distance between members 15 and 16, a continuous log of the diameter of bore hole 11 as a function of depth may be obtained.

A housing 55 constructed of an electrically conductive material is mounted on a rearward lower portion of pad 15, but is electrically insulated from any conductive parts thereof. Another wall-engaging member 56 constructed of an electrically conductive material is connected to a metallic pivot pin 57 supported for rotational movement by housing 55. Thus, although the pin 57 and member 56 are movable in the same direction substantially in unison with pad 15, member 56 is supported as a lever by wall-engaging member 15 for movement relative thereto. Lever 56 is provided with an extension 58 extending below member 15 and having a relatively small cutting edge 59 adapted to penetrate a side wall portion of bore hole 11 which may, for example, have a mud cake 60 that usually forms from drilling mud 13 during drilling operations.

Figure 3:
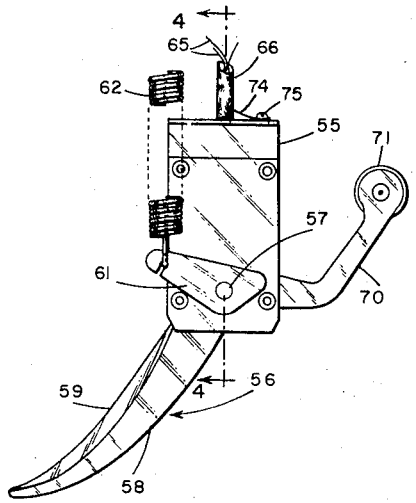
Fig. 3 is an enlarged representation of a portion of the bore hole apparatus shown in Fig. 1.

As may be best seen in Fig. 3, an arm 61 is coupled to lever 56 by means of a keyed connection (not shown) to pivot pin 57. Arm 61 extends transversely relative to lever 56 and its free end is connected to one extremity of a tension spring 62, the other extremity of which is connected to a rear portion of pad 15. Thus, portion 58 of the wall-engaging member 56 is biased with respect to wall-engaging member 15 toward the side wall of bore hole 11.

Figure 4:
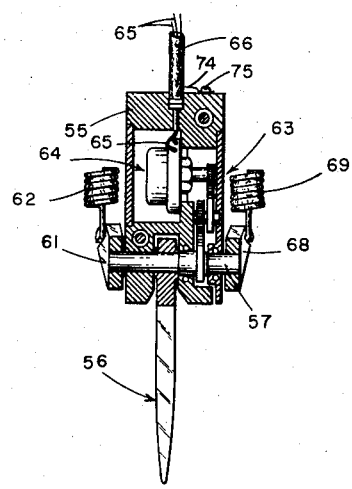
Fig. 4 is a cross sectional view taken along the line 4—4 of Fig. 3.

A suitable mechanical linkage, such as a gear train represented by numeral 63 in Fig. 4, couples pin 57 to a potentiometer 64 so that the electrical resistance of the potentiometer is a function of relative movement between wall-engaging members 15 and 56. Electrical connections 65 from potentiometer 64 extend through a fluid-tight cable 66 which passes along member 15 and through arm 22 as shown in Fig. 1. These connections also extend through housing 18 and cable 14, and terminate at a recording ohm meter 67 located at the surface of the earth. It is thus evident that the apparatus includes means in the form of potentiometer 64 supported by pad 15 for obtaining indications responsive to relative movement between pad 15 and lever 56. The recording medium in ohm meter 67 is displaced in proportion to movement of tool 10 through bore hole 11 so that a continuous log of relative movement between wall-engaging members 15 and 56 may be obtained as a function of depth in the bore hole.

As may be evident in Fig. 4, an arm 68 is positioned at the extremity of pivot pin 57 opposite arm 61, and another tension spring 69 connected between the end of arm 68 and a rear portion of pad 15 cooperates with tension spring 62.

Referring again to Fig. 3, another arm 70 coupled to pivot pin 57 by a keyed connection (not shown) extends rearwardly of housing 55 and terminates at a roller 71 positioned to engage an extension 79 fixed to a lower, rear portion of pad 16. Thus, when wall-engaging members 15 and 16 are displaced in a direction toward one another, the roller 71 engages extension 79 of pad 16 thereby to rotate lever 56 about the axis of pin 57. In this way lever 56 is retracted against the bias of springs 62 and 69.

Since the cutting edge 59 is positioned below wall-engaging member 15, it is readily movable relative thereto and may not as easily be clogged by accumulations of drilling mud 13 as in certain prior art arrangements. To further minimize the accumulation of extraneous material on wall-engaging member 56, there is provided a source of electric current such as a battery 72 which may be located at the surface of the earth. The positive terminal of battery 72 is grounded at reference point 73 and its negative terminal is connected by a lead 74 which extends through cable 14, housing 18 and cable 66 to a connection 75 at the upper end of housing 55. Since this housing, as well as pivot pin 57 and wall-engaging member 56 are constructed of an electrically conductive material, an electrical circuit is completed between battery 72 and wall-engaging member 56 so that an electric current may be passed between member 56 and drilling liquid 13.

Figure 2:
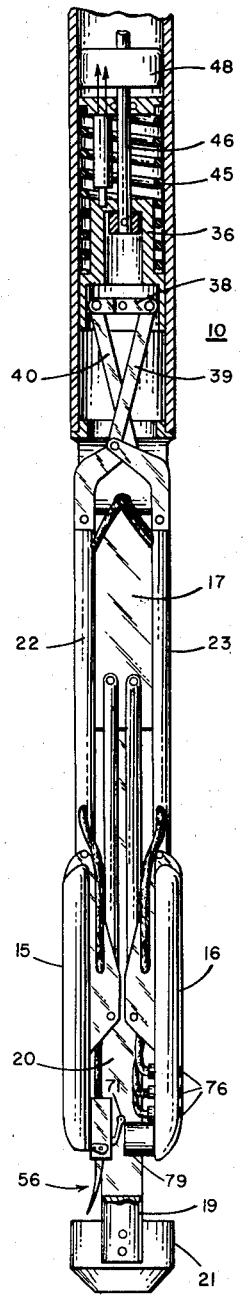
Fig. 2 is a view similar to the illustration of Fig. 1, but showing the apparatus in a retracted condition facilitating its insertion in and removal from a bore hole.

In order to condition tool 10 for operation, motor 48 is energized to draw rod 46 in an upward direction thereby drawing driving element 36 to its fully upward position as shown in Fig. 2. Thus, rocker arm 38 is at its uppermost position and linkages 39 and 40 maintain arms 22 and 23 and pads 15 and 16 at their innermost positions relative to the axis of support 17. In addition, by virtue of engagement between roller 71 and extension 79, member 56 is maintained in a retracted position. Accordingly, bore hole tool 10 may be freely lowered to a desired level in bore hole 11.

At the desired level motor 48 is de-energized and rod 46 is released so that compression spring 45 forces driving element 36 in a downward direction. This movement is transferred to rocker arm 38 and, by means of linkages 39 and 40, to arms 22 and 23. This leverage supplied by extensions 28 and 29 of the arms 22 and 23 forces pads 15 and 16 toward the side wall of the bore hole and faces 15' and 16' are brought into engagement with respective side wall portions where they are maintained because of the bias of spring 45. Since rocker arm 38 may pivot about pin 37, the downward force transmitted to linkages 39 and 40 may be applied at different vertical points. Accordingly, arms 22 and 23 may be extended different lateral distances and pads 15 and 16 may be spaced different distances from the longitudinal axis of support 17. Thus, despite irregularities in the side wall of bore hole 11, each of the pads 15 and 16 is maintained in engagement with the wall regardless of the position of the longitudinal axis of support 17 and the electrical resistance of potentiometer 50 as recorded by ohm meter 52 provides an indication of variations in bore hole diameter.

If desired, pad 16 may be provided with an array of electrodes 76 which may be employed to derive certain information concerning the electrical resistivity of formations 12 in a well known manner.

At the same time a record of bore hole diameter is made, as tool 10 is drawn upwardly through bore hole 11, springs 62 and 69 urge cutting edge 59 of the wall-engaging member 56 against the side wall of the bore hole in a zone closely adjacent pad 15. By suitably adjusting the tension of springs 62 and 69, a desired blade pressure against the side wall may be achieved. For example, a blade pressure of eight pounds may be employed so that cutting edge 59 penetrates mud cake 60. The amount of penetration, and hence the degree of relative movement between wall-engaging members 15 and 56, is dependent upon the character of the mud cake 60 or of the side wall portion engaged by cutting edge 59. Accordingly, the resistance of potentiometer 64, as recorded by ohm meter 67 provides a log of the degree of penetration by cutting edge 59 which may be interpreted as a record of mud cake thickness as a function of depth of tool 10 in bore hole 11.

Figure 5:
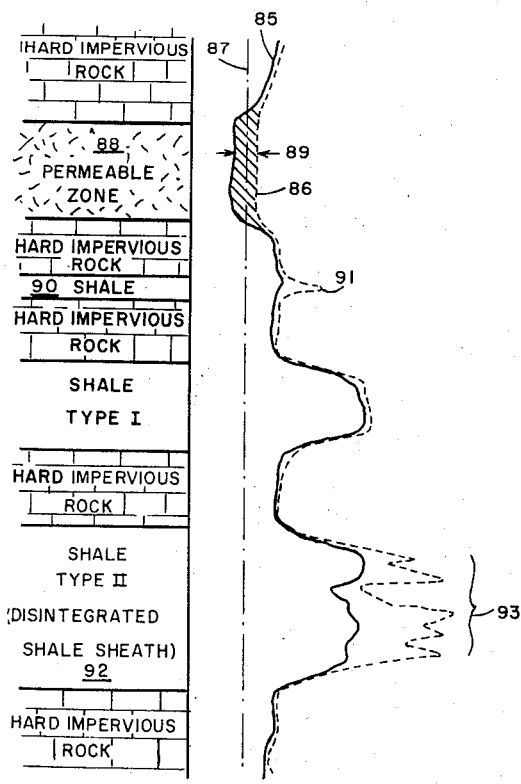
Fig. 5 illustrates a typical record which may be obtained through the use of apparatus embodying the present invention.

If desired, extensions of leads 51 and 65 may be connected to a combining circuit 80 which operates in a well known manner to derive the summation of the distance between pads 15 and 16 and a quantity equal to two times the relative displacement between members 15 and 56. This potential is supplied to a recorder 81. Thus, while recording ohm meter 52 derives a record which may be defined as the inner diameter, $D_i$, of bore hole 11, recorder 81 derives what might be considered the outer diameter, $D_o$, of the bore hole. The record of outer diameter which is effectively measured from the tip of blade 58 provides an indication of the true profile of bore hole 11 and makes possible the detection of hole diameter anomalies which may in some cases be as small as one-eighth of an inch, such as the crevices and vugs of cavernous formations. An example of this type of log is shown in Fig. 5 in which diameter is presented as a function of depth, inner diameter being plotted as a solid line 85 and outer diameter being plotted as a broken line 86. For reference purposes, a vertical broken line 87 is used to indicate the relative size of the bit employed for drilling the bore hole.

It will be noted that opposite a permeable zone 88, a separation 89 occurs between curves 85 and 86. Such a separation may be interpreted as a measurement of the thickness of the mud cake on the side wall of the bore hole along this zone. Opposite shale formation 90, the outer diameter increases abruptly as indicated by a break 91 in curve 86. This may be taken as an indication of a thin caving smaller than the longitudinal length of pad 15. Opposite shale bed 92, the outer diameter curve at section 93 illustrates the degree of irregularity which may be characteristic of the bore hole side wall, but which because of the size of pad 15 is not shown in as great a detail on the inner diameter log.

As is well known, clay is present everywhere in a bore hole that is filled with a water base mud and wet clay has a tendency to adhere to smooth metal surfaces. Such an accumulation on cutting edge 59 of lever 56 would be most detrimental to accurate measurements of the character of the side wall of bore hole 11. However, since an electrical current is supplied from battery 72 to lever 56, with the polarity such that it acts as a cathode, an accumulation of extraneous material does not occur as will be more evident from the following discussion.

By virtue of the current flow between lever 56 and drilling liquid 13, electro-osmosis occurs in which the liquid constituents of the drilling mud move with respect to the solid constituents in a direction toward the surface of member 56. In addition, because of electrophoresis, the colloidal particles in the drilling mud, such as clay particles, are charged negatively and are repelled by the cathode (member 56). Furthermore, electrolytic water transport may occur which further aids in carrying the liquid part of the drilling mud in a direction toward the cathode. As a result of these actions, a film of water is formed on the cathode which effectively lubricates the cathode thereby preventing adherence of clay particles.

In practice, a current density of 5 milliamperes per square centimeter may be employed; however, a current density of 2 milliamperes per square centimeter produces noticeable lubrication. Of course, current densities higher than 5 milliamperes per square centimeter may be employed. It appears that for a given current, this type of electrical lubrication is more effective in relatively non-conductive drilling muds, i. e., having a resistivity of a few ohms per square meter per meter. In relatively conductive muds (very salty) in which a resistivity of 0.1 ohm per square meter per meter may occur, the effects of electro-osmosis and cataphoresis are probably negligible and electrical lubrication is probably due chiefly to electrolysis. In general, for all practical purposes, the amount of water transported to the cathode is proportional to the intensity of the current passing between the cathode and ground.

It is thus apparent that by effectively isolating wall-engaging member 56, i. e., electrically insulating it from support 17, and supplying a unidirectional current of sufficient intensity with such polarity that member 56 is a cathode, its cutting edge 58 remains clean even though it continuously contacts and penetrates the side wall of bore hole 11. Consequently, the detrimental effects of accumulation of clay on cutting edge 58 are avoided in bore hole apparatus embodying the present invention.

To equalize the pressure on the seals for shaft 57, housing 55 may be filled with an oil and a suitable oil-filled bellows (not shown), or a resilient tube having its free end closed (not shown), may be fluidly coupled to the interior of housing 55. Thus, the pressure exerted by the drilling mud produces a corresponding pressure within the housing.

If desired, supports 19 and 20 shown in Fig. 1 may be suitably extended to provide a place for a centralizer (not shown), another centralizer (not shown) may be positioned on housing 18. In this way the axis of tool 10 may be maintained in alignment with the longitudinal axis of the bore hole.

Figure 6:
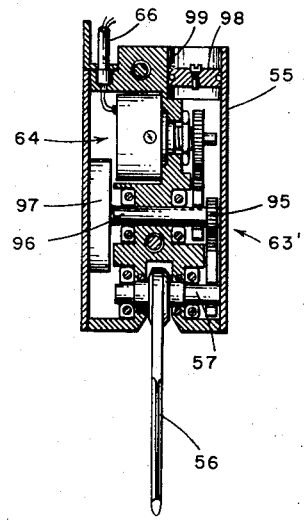
Fig. 6 is a view similar to that shown in Fig. 4, but illustrating a modification which may be made to the portion of the apparatus there shown.

In the modified arrangement of Fig. 6, external members 61 and 68 and springs 62 and 69 are not required thereby to minimize further the possibility of clogging effects of drilling mud 13. To this end, pivot pin 57 is connected to potentiometer 64 via a modified coupling system 63' here shown as a train of gears. Included in coupling system 63' is a gear 95 connected by a shaft 96 to a helical spring 97. Spring 97 is arranged in a known manner to provide a rotational bias on shaft 96 which is transferred by means of gear train 63' and pivot pin 57 to lever 56. The direction of this bias is such that the lever is carried in a direction toward the side wall of the bore hole in the manner described in connection with Figs. 1–4.

For pressure equilization, there is provided a piston 98 positioned for sliding movement in a cylinder 99 which opens into the interior of the housing. The housing and the cylinder are filled with a suitable oil.

While a particular embodiment of the present invention has been shown and described, it is apparent that changes and modifications may be made without departing from this invention in its broader aspects, and therefore the aim in the appended claims is to cover all such changes and modifications as fall within the true spirit and scope of this invention.

I claim:
1. Bore hole apparatus comprising: a support adapted to be passed through a bore hole; a first wall-engaging member, having a relatively large surface for substantially non-penetrating engagement with the side wall of the bore hole mounted on said support for movement relative thereto; means for displacing said first wall-engaging member to effect movements thereof selectively away from and toward said support; a second wall-engaging member including a lever pivotally connected to said first wall-engaging member and having a relatively small cutting edge adapted to penetrate a side wall portion of the bore hole; means for biasing said lever about its pivot to urge said cutting edge toward the side wall of the bore hole; contact means on said support; an arm connected to said lever and having a portion engageable with said contact means when said first wall-engaging member is displaced toward said support to rotate said lever about its pivot against the urging of said biasing means, thereby to retract said second wall-engaging member relative to said first wall-engaging member; and means for obtaining a record of relative movement between said first and said second wall-engaging members.

2. Bore hole apparatus comprising: a support adapted to be passed through a bore hole; a first wall-engaging member, having a relatively large surface for substantially non-penetrating engagement with the sidewall of the bore hole mounted on said support for movement relative thereto; means for displacing said first wall-engaging member to effect movement thereof selectively away from and toward said support; a second wall-engaging member including a lever pivotally connected to said first wall-engaging member and having a relatively small cutting edge adapted to penetrate a sidewall portion of the bore hole; means for biasing said lever about its pivot to urge said cutting edge toward the sidewall of the bore hole; a third wall-engaging member mounted on said support opposite said first wall-engaging member for movement relative to said support away from and toward said support concomitantly with the aforesaid movement of said first wall-engaging member; an arm connected to said lever and engagable with said third wall-engaging member when said first and said third wall-engaging members are displaced toward said support to rotate said lever about its pivot against the urging of said biasing means, thereby to retract said second wall-engaging member relative to said first wall-engaging member; and means for obtaining a record responsive to relate movement between said first and second wall-engaging members.

3. Bore hole apparatus comprising: a carrier adapted to be passed through a bore hole; a first wall-engaging member movably connected to said carrier and having a relatively large surface for substantially non-penetrating engagement with the side wall of the bore hole and defining the maximum outward extent of movement of said first wall-engaging member; means for displacing said first wall-engaging member away from and toward said carrier; a second wall-engaging member having a relatively small cutting edge adapted to penetrate a side wall portion of the bore hole; a support for said second wall-engaging member coupled to said first wall-engaging member and movable therewith in the same direction substantially in unison and providing for relative movement between said first and said second wall-engaging members; spring means connected between said first and said second wall-engaging members for biasing said cutting edge with respect to said first wall-engaging member toward the side wall of the bore hole; contact means on said carrier; means responsive to movement of said first wall-engaging member toward said carrier engaging said contact means for displacing said second wall-engaging member in a direction against the bias of said spring means; and means supported by said first wall-engaging member for obtaining an indication of relative movement between said first and said second wall-engaging members.

4. Bore hole apparatus comprising: a carrier adapted to be passed through a bore hole; a first wall-engaging member movably connected to said carrier and having a relatively large surface for substantially non-penetrating engagement with the side wall of the bore hole and defining the maximum outward extent of movement of said first wall-engaging member; means for displacing said first wall-engaging member away from and toward said carrier; a second wall-engaging member having a relatively small cutting edge adapted to penetrate a side wall portion of the bore hole and spaced from said surface of said first wall-engaging member in a direction essentially parallel to the longitudinal axis of the bore hole; a support for said second wall-engaging member coupled to said first wall-engaging member and movable therewith in the same direction substantially in unison and providing for relative movement between said first and said second wall-engaging members; means for biasing said second wall-engaging member relative to said first wall-engaging member toward cutting engagement with the side wall of the bore hole; contact means on said carrier; means responsive to movement of said first wall-engaging member toward said carrier engaging said contact means for displacing said second wall-engaging member in a direction away from cutting engagement with the side wall of the bore hole; and means supported by said first wall-engaging member for obtaining an indication of relative movement between said first and said second wall-engaging members.

5. Bore hole apparatus comprising: a carrier adapted to be passed through a bore hole; a first wall-engaging member movably connected to said carrier and having a relatively large surface for substantially non-penetrating engagement with the side wall of the bore hole and defining the maximum outward extent of movement of said first wall-engaging member; means for passing said carrier through a bore hole in at least one direction; means for displacing said first wall-engaging member away from and toward said carrier; a second wall-engaging member having a relatively small cutting edge adapted to penetrate a side wall portion of the bore hole and spaced from said surface of said first wall-engaging member in a direction essentially parallel to the longitudinal axis of the bore hole but opposite to said one direction; a support for said second wall-engaging member coupled to said first wall-engaging member and movable therewith in the same direction substantially in unison and providing for relative movement between said first and said second wall-engaging members; means for biasing said second wall-engaging member relative to said first wall-engaging member toward cutting engagement with the side wall of the bore hole; contact means on said carrier; means responsive to movement of said first wall-engaging member toward said carrier engaging said contact means for displacing said second wall-engaging member in a direction away from cutting engagement with the side wall of the bore hole; and means supported by said first wall-engaging member for obtaining an indication of relative movement between said first and said second wall-engaging members.

6. Bore hole apparatus comprising: a carrier adapted to be passed through a bore hole containing a relatively conductive liquid; a first wall-engaging member movably connected to said carrier and having a relatively large surface for substantially non-penetrating engagement with the side wall of the bore hole and defining the maximum outward extent of movement of said first wall-engaging member; means for displacing said first wall-engaging member away from and toward said carrier; a second wall-engaging member constructed of an electrically conductive material, and having a relatively small cutting edge adapted to penetrate a side wall portion of the bore hole; a support for said second wall-engaging member coupled to said first wall-engaging member and movable therewith in the same direction substantially in unison and providing for relative movement between said first and said second wall-engaging member; means for biasing said second wall-engaging member relative to said first wall-engaging member toward cutting engagement with the side wall of the bore hole; a source of electric current having one terminal connected to said second wall-engaging member and another terminal connected to a reference point for passing a current between said second wall-engaging member and the liquid of the bore hole to minimize the accumulation of extraneous material on said second wall-engaging member; contact means on said carrier; means responsive to movement of said first wall-engaging member toward said carrier engaging said contact means for displacing said second wall-engaging member in a direction away from cutting engagement with the side wall of the bore hole; and means supported by said first wall-engaging member for obtaining an indication of relative movement between said first and said second wall-engaging members.

7. Bore hole apparatus comprising: a carrier adapted to be passed through a bore hole; a first wall-engaging member, having a relatively large surface for substantially non-penetrating engagement with the side wall of the bore hole and defining the maximum outward extent of movement of said first wall-engaging member mounted on said carrier for movement relative thereto; means for biasing said first wall-engaging member relative to said carrier toward the side wall of the bore hole to bring said surface into engagement therewith and for retracting said first wall-engaging member; a second wall-engaging member having a relatively small cutting edge adapted to penetrate a side wall portion of the bore hole; a support for said second wall-engaging member coupled to said first wall-engaging member and movable therewith in the same direction substantially in unison and providing for relative movement between said first and said second wall-engaging members; means for biasing said second wall-engaging member relative to said first wall-engaging member toward cutting engagement with the side wall of the bore hole; contact means on said carrier; means responsive to movement of said first wall-engaging member toward said carrier engaging said contact means for displacing said second wall-engaging member in a direction away from cutting engagement with the side wall of the bore hole; and means supported by said first wall-engaging member for obtaining an indication of relative movement between said first and said second wall-engaging members.

8. Bore hole apparatus comprising: a support adapted to be passed through a bore hole; a first wall-engaging member, having a relatively large surface for substantially non-penetrating engagement with the side wall of the bore hole and defining the maximum outward extent of movement of said first wall-engaging member; means mounting said first wall-engaging member on said support for movement relative thereto toward and away from the side wall of the bore hole while maintaining said surface substantially parallel to a reference axis of said support; a second wall-engaging member having a relatively small cutting edge adapted to penetrate a side wall portion of the bore hole; a support for said second wall-engaging member coupled to said first wall-engaging member and movable therewith in the same direction substantially in unison and providing for relative movement between said first and said second wall-engaging members; means for biasing said second wall-engaging member relative to said first wall-engaging member toward cutting engagement with the side wall of the bore hole; contact means on said support; means responsive to movement of said first wall-engaging member toward said carrier engaging said contact means for displacing said second wall-engaging member in a direction away from cutting engagement with the side wall of the bore hole; and means supported by said first wall-engaging member for obtaining an indication of relative movement between said first and said second wall-engaging members.

9. Bore hole apparatus comprising: a pair of wall-engaging members adapted to be passed through a bore hole in diametrically opposed relationship to the bore hole axis and individually having large surfaces for substantially non-penetrating engagement with the sidewall of the bore hole defining the maximum outward extent of movement of said wall-engaging members; means for biasing said pair of wall-engaging members away from one another into engagement with opposite sidewall portions of the bore hole and for retracting said pair of wall-engaging members; another wall-engaging member having a relatively small cutting edge adapted to penetrate a sidewall portion of the bore hole; a support for said other wall-engaging member coupled to one of said pair of wall-engaging members and movable therewith in the same direction substantially in unison and providing for relative movement between said other and said one wall-engaging member; means for biasing said other wall-engaging member relative to said one wall-engaging member toward cutting engagement with the side wall of the bore hole; means responsive to relative inward movement of said pair of wall-engaging members for displacing said other wall-engaging member relative to said one of said pair of wall-engaging members in a direction away from cutting engagement with the sidewall of the bore hole; means for deriving a signal responsive to the relative distance between said pair of wall-engaging members; means supported by said one wall-engaging member for deriving another signal responsive to relative movement between said one and said other wall-engaging members; and means for deriving indications responsive to a combination of said first-mentioned and said other signals.

References Cited in the file of this patent

UNITED STATES PATENTS

| Re. 12,715 | Dawkins | Nov. 5, 1907 |
| 2,372,575 | Hayward | Mar. 27, 1945 |
| 2,398,562 | Russell | Apr. 16, 1946 |
| 2,588,717 | Goodwin | Mar. 11, 1952 |